United States Patent
Kielstra et al.

(10) Patent No.: US 10,761,914 B2
(45) Date of Patent: Sep. 1, 2020

(54) REPLACING GENERATED PROCEDURE CALLS WITH GENERATED INTER-PROCESS COMMUNICATION

(71) Applicant: INTERNATIONAL BUSINESS MACHINES CORPORATION, Armonk, NY (US)

(72) Inventors: Allan H. Kielstra, Ajax (CA); Artur Kink, Richmond Hill (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/161,483

(22) Filed: Oct. 16, 2018

(65) Prior Publication Data
US 2020/0117524 A1    Apr. 16, 2020

(51) Int. Cl.
*G06F 9/54* (2006.01)

(52) U.S. Cl.
CPC .............. *G06F 9/547* (2013.01); *G06F 9/542* (2013.01); *G06F 9/546* (2013.01)

(58) Field of Classification Search
CPC ........... G06F 9/542; G06F 9/546; G06F 9/547
See application file for complete search history.

(56) References Cited

U.S. PATENT DOCUMENTS

| 7,444,619 | B2 | 10/2008 | McManus |
| 7,669,209 | B2 | 2/2010 | Inohara et al. |
| 8,782,117 | B2 | 7/2014 | Nachreiner et al. |
| 9,411,707 | B1 | 8/2016 | Hale et al. |
| 2004/0226023 | A1* | 11/2004 | Tucker ........... G06F 9/54 719/315 |
| 2005/0229189 | A1* | 10/2005 | McManus ........... G06F 9/547 719/330 |
| 2007/0106722 | A1* | 5/2007 | Zeldin ........... G06F 9/547 709/201 |
| 2007/0106998 | A1* | 5/2007 | Zeldin ........... G06F 9/547 719/313 |
| 2014/0059566 | A1* | 2/2014 | Benedek ........... G06F 9/54 719/313 |
| 2015/0186192 | A1* | 7/2015 | Dyakin ........... G06F 9/54 719/313 |

OTHER PUBLICATIONS

Mell, Peter and Tim Grance, "The NIST Definition of Cloud Computing," National Institute of Standards and Technology, Information Technology Laboratory, Special Publication 800-145, Sep. 2011, pp. 1-7.

IBM, "z/Architecture—Principles of Operation," IBM Publication No. SA22-7832-10, Eleventh Edition, Mar. 2015, pp. 1-1732.

* cited by examiner

*Primary Examiner* — Charles E Anya
(74) *Attorney, Agent, or Firm* — Noah Sharkan, Esq.; Kevin P. Radigan, Esq.; Heslin Rothenberg Farley & Mesiti P.C.

(57) ABSTRACT

A package generated by a compiler of a computing environment is to be used in inter-process communication between one module and another module running in a single address space of the computing environment. The one module is one class of module and the other module is another class of module, in which the one class of module is different from the other class of module. The one module calls the other module using the inter-process communication, which employs the package generated by the compiler. The called module performs one or more operations, and the one module is placed in a wait state.

20 Claims, 13 Drawing Sheets

OBTAIN A PACKAGE GENERATED BY A COMPILER OF THE COMPUTING ENVIRONMENT TO BE USED IN INTER-PROCESS COMMUNICATION BETWEEN ONE MODULE AND ANOTHER MODULE RUNNING IN A SINGLE ADDRESS SPACE OF THE COMPUTING ENVIRONMENT ~ 400

THE PACKAGE INCLUDES ONE OR MORE DATA CONVERSIONS OF DATA BETWEEN THE ONE MODULE AND THE OTHER MODULE ~ 402

THE ONE MODULE BEING ONE CLASS OF MODULE AND THE OTHER MODULE BEING ANOTHER CLASS OF MODULE, THE ONE CLASS OF MODULE BEING DIFFERENT THAN THE OTHER CLASS OF MODULE ~ 404

THE COMPILER IS OF A LANGUAGE OF THE ONE MODULE ~ 406

CALL, BY THE ONE MODULE, THE OTHER MODULE USING THE INTER-PROCESS COMMUNICATION ~ 408

THE INTER-PROCESS COMMUNICATION INCLUDES ONE OR MORE COMMUNICATION OBJECTS GENERATED BY THE COMPILER AND USED IN PLACE OF ONE OR MORE PROCEDURE CALLS TO COMMUNICATE BETWEEN THE ONE MODULE AND THE OTHER MODULE ~ 410

THE INTER-PROCESS COMMUNICATION EMPLOYS THE PACKAGE ~ 411

PERFORM, BASED ON CALLING THE OTHER MODULE, ONE OR MORE OPERATIONS BY THE OTHER MODULE ~ 412

---

PERFORM ONE OR MORE OPERATIONS BY THE ONE MODULE ~ 414

THE ONE OR MORE OPERATIONS INCLUDE THE CALLING THE OTHER MODULE ~ 416

THE OTHER MODULE IS IN A WAIT STATE ~ 418

BASED ON CALLING THE OTHER MODULE, THE ONE MODULE IS PLACED IN A WAIT STATE ~ 420

---

THE ONE MODULE AND THE OTHER MODULE BEHAVE LOGICALLY AS A SINGLE PROGRAM, IN THAT BASED ON ONE OF THE ONE MODULE OR THE OTHER MODULE PERFORMING WORK, THE OTHER OF THE ONE MODULE OR THE OTHER MODULE IS WAITING ~ 422

FIG. 4A

SEND A REPLY FROM THE OTHER MODULE TO THE ONE MODULE, BASED ON THE OTHER MODULE PERFORMING AT LEAST ONE OPERATION OF THE ONE OR MORE OPERATIONS ~430

THE REPLY INCLUDES A MESSAGE SELECTED FROM A GROUP OF MESSAGES CONSISTING OF: A WORK COMPLETE MESSAGE, A REPLY MESSAGE INDICATING THE ONE MODULE IS TO PERFORM WORK SO THAT THE OTHER MODULE CAN COMPLETE ITS WORK, AND AN EXCEPTION OR FAILURE MESSAGE ~432

THE CALLING THE OTHER MODULE INCLUDES ISSUING, BY THE ONE MODULE, A MESSAGE TO THE OTHER MODULE INDICATING THE OTHER MODULE IS TO BEGIN EXECUTING WORK ~434

THE ISSUING THE MESSAGE INCLUDES PERFORMING A POST TO A SYNCHRONIZATION OBJECT OF THE ONE OR MORE COMMUNICATION OBJECTS ~436

THE ONE CLASS OF MODULE PERFORMS PROCESSING USING ONE SIZE OF ADDRESSES AND THE OTHER CLASS OF MODULE PERFORMS PROCESSING USING ANOTHER SIZE OF ADDRESSES ~438

THE ONE CLASS OF MODULE IS DIFFERENT FROM THE OTHER CLASS OF MODULE BASED ON THE ONE CLASS OF MODULE AND THE OTHER CLASS OF MODULE HAVING AN ATTRIBUTE SELECTED FROM A GROUP OF ATTRIBUTES CONSISTING OF: DIFFERENT ADDRESSING MODES, DIFFERENT BIT-SIZED MODULES, DIFFERENT PROGRAMMING LANGUAGES, DIFFERENT CALLING CONVENTIONS, DIFFERENT LINKAGE CONVENTIONS AND DIFFERENT EXECUTION PROPERTIES ~440

THE PACKAGE INCLUDES ONE OR MORE ACCESS METHODS TO ONE OR MORE STRUCTURES ASSOCIATED WITH THE ONE MODULE ~442

THE PACKAGE INCLUDES ONE OR MORE SUPPORT CALLS FOR THE OTHER MODULE ~444

FIG. 4B

REPLACING GENERATED PROCEDURE CALLS WITH GENERATED INTER-PROCESS COMMUNICATION

BACKGROUND

One or more aspects relate, in general, to processing within a computing environment, and in particular, to facilitating such processing.

In one example, processing within a computing environment includes communicating between multiple program modules of different classes executing within the computing environment. There are cases where procedure calls in a programming language are inefficient or impossible to use. For example, if module A is compiled with one calling convention and module B is compiled with a different calling convention, it is often the case that a call between module A and module B incurs a significant cost at runtime to adapt the one calling convention to the other calling convention. Another example is where module A is, for instance, a 64-bit module in that it uses 64-bit registers, addresses or address buses, and module B is not a 64-bit module. In many systems, these two modules may not interact at all.

In an effort to address the above, user-defined software structures have been employed. For instance, for the case in which modules are compiled with different calling conventions, an artificial set of calls across the calling convention boundary is constructed to minimize the number of calls, and thus, minimize the aggregate code. Further, for the cases in which different bit modules are to communicate, user-defined software structures are used to perform inter-process communication.

SUMMARY

Shortcomings of the prior art are overcome and additional advantages are provided through the provision of a computer program product for facilitating processing within a computing environment. The computer program product includes a computer readable storage medium readable by a processor and storing instructions for performing a method. The method includes obtaining a package generated by a compiler of the computing environment to be used in inter-process communication between one module and another module running in a single address space of the computing environment. The package includes one or more data conversions of data between the one module and the other module. The one module is one class of module and the other module is another class of module. The one class of module is different from the other class of module, and the compiler is of a language of the one module. The one module calls the other module using the inter-process communication. The inter-process communication includes one or more communication objects generated by the compiler and used in place of one or more procedure calls to communicate between the one module and the other module. The inter-process communication employs the package generated by the compiler. Based on calling the other module, one or more operations are performed by the other module.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIGS. 4A-4B depict one example of facilitating processing within a computing environment, in accordance with one or more aspects of the present invention;

DETAILED DESCRIPTION

In accordance with an aspect of the present invention, a capability is provided for facilitating processing within a computing environment. For example, a capability is provided in which language compilers provide inter-process communication to enable program modules (also referred to herein as modules) of different classes, running in the same address space, to communicate without using user-provided software structures and without altering computer languages or primitives. As used herein, a module may be a portion of an overall program, such as a subroutine, or it may be a program, itself. Modules are of different classes, if, for instance, they use different sized registers, addresses and/or address buses (e.g., 64-bit and 31-bit, etc.), different programming languages, different addressing modes, different execution properties, different linkage conventions and/or different calling conventions, etc.

In one example, the compiler replaces natural calls of the modules with compiler-generated inter-process communication. For instance, the compiler generates the inter-process communication, including a generated language (e.g., Java) package for use in the inter-process communication, instead of the natural calls (e.g., procedure calls, such as module A calls module B), absent knowledge to the user (e.g., programmer or users of the modules). Java and all Java-based trademarks and logos are trademarks or registered trademarks of Oracle and/or its affiliates.

One embodiment of a computing environment to incorporate and use one or more aspects of the present invention is described with reference to FIG. 1. In one example, the computing environment is based on the z/Architecture® hardware architecture, offered by International Business Machines Corporation, Armonk, N.Y. One embodiment of the z/Architecture hardware architecture is described in a publication entitled "z/Architecture Principles of Operation," IBM Publication No. SA22-7832-11, 12$^{th}$ edition, September 2017, which is hereby incorporated herein by reference in its entirety. The z/Architecture hardware architecture, however, is only one example architecture; other architectures and/or other types of computing environments may include and/or use one or more aspects of the present invention.

Figure 1:
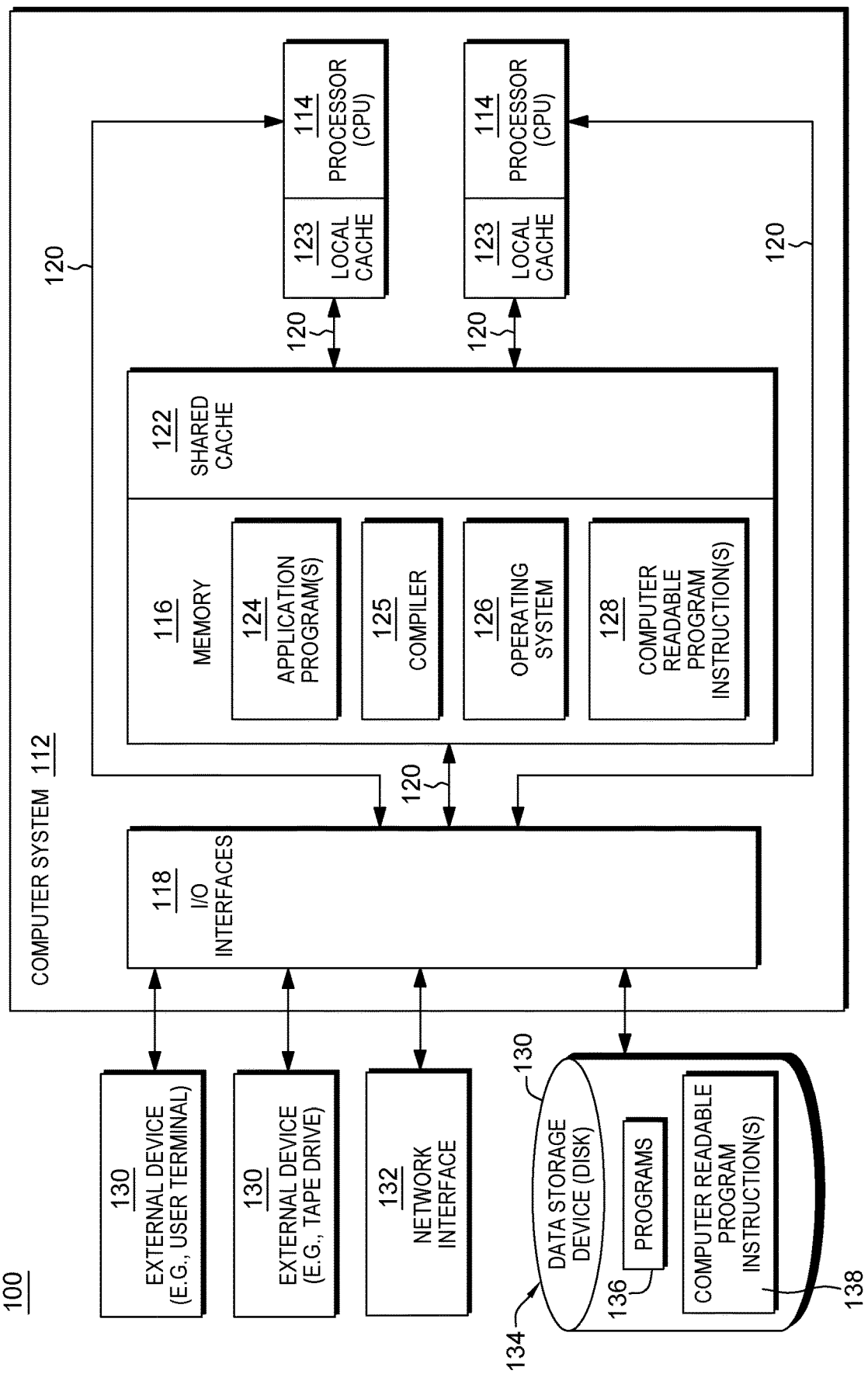
FIG. 1 depicts one example of a computing environment to incorporate and use one or more aspects of the present invention.

As shown in FIG. 1, a computing environment 100 includes, for instance, a computer system 112 shown, e.g., in the form of a general-purpose computing device. Computer system 112 may include, but is not limited to, one or more processors or processing units 114 (e.g., central processing units (CPUs)), a memory 116 (a.k.a., system memory, main memory, main storage, central storage or storage, as examples), and one or more input/output (I/O) interfaces 118, coupled to one another via one or more buses and/or other connections 120.

Bus 120 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 116 may include, for instance, a cache, such as a shared cache 122, which may be coupled to local caches 123 of processors 114. Further, memory 116 may include one or more programs or applications 124, a compiler 125, an operating system 126 (e.g., such as a z/OS® or MVS™ (Multiple Virtual Storage) operating system, offered by International Business Machines Corporation, or other operating systems), and one or more computer readable program instructions 128. Computer readable program instructions 128 may be configured to carry out functions of embodiments of aspects of the invention.

Computer system 112 may also communicate via, e.g., I/O interfaces 118 with one or more external devices 130 and/or one or more network interfaces 132. Example external devices include a user terminal, data storage devices, such as a tape drive, disk or other data storage devices, a pointing device, a display, etc. In one particular example, a data storage device 134 may store one or more programs 136, one or more computer readable program instructions 138, and/or data, etc. The computer readable program instructions may be configured to carry out functions of embodiments of aspects of the invention.

Network interface 132 enables computer system 112 to communicate with one or more networks, such as a local area network (LAN), a general wide area network (WAN), and/or a public network (e.g., the Internet), providing communication with other computing devices or systems.

Computer system 112 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 112. Examples, include, but are not limited to: microcode, device drivers, redundant processing units, external disk drive arrays, RAID systems, tape drives, and data archival storage systems, etc.

Computer system 112 may be operational with numerous other general purpose or special purpose computing system environments or configurations. Examples of well-known computing systems, environments, and/or configurations that may be suitable for use with computer system 112 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 2:
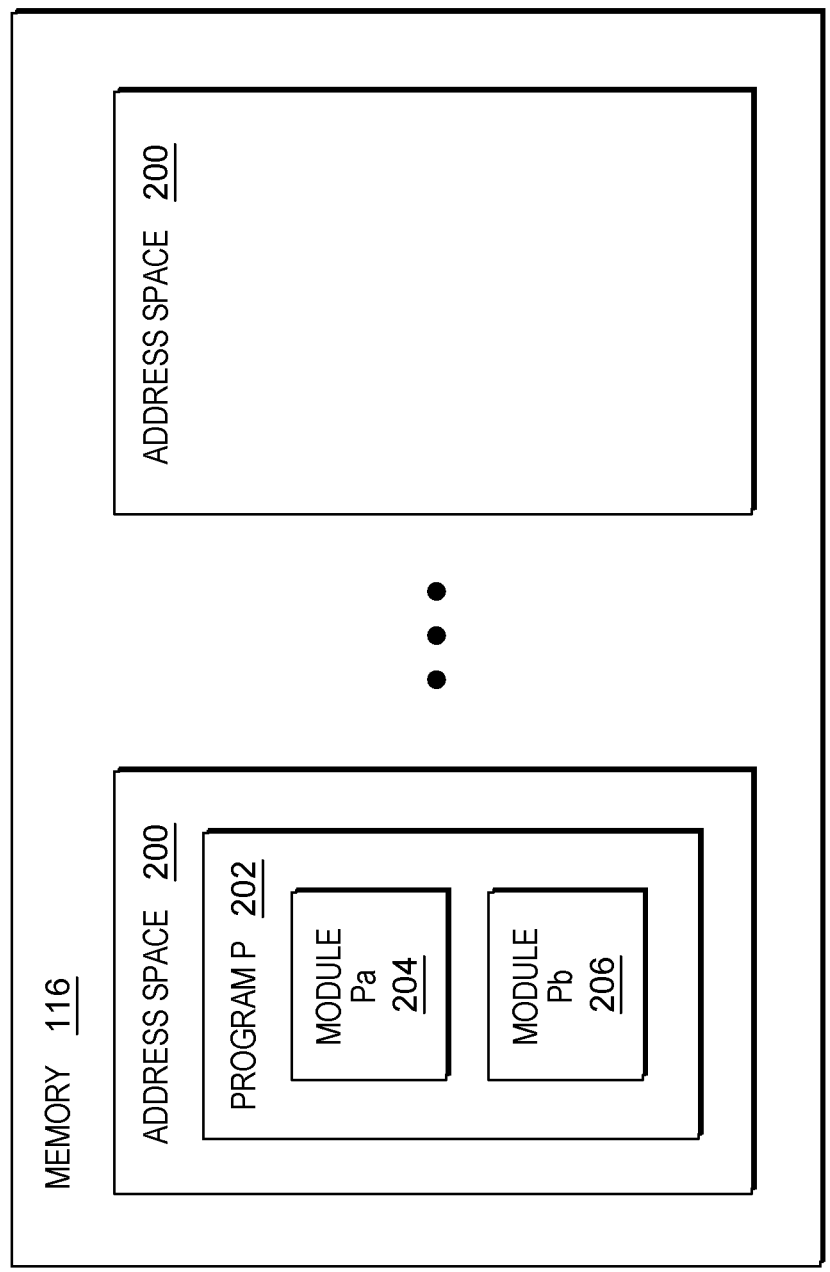
FIG. 2 depicts one example of multiple modules executing within an address space, in accordance with one or more aspects of the present invention.

Further details regarding memory 116 are described with reference to FIG. 2. Memory 116 includes, for instance, one or more address spaces 200. An address space is a range of valid addresses in memory that are available for a program or a process. It is the memory that a program or a process can access. The memory can be either physical or virtual and is used for executing instructions and storing data.

In one example, with certain operating systems, such as the z/OS operating system, multiple modules may run in the same address space (e.g., the same virtual address space). For example, assume a program P 202, having one execution stack, includes a set of subroutines that make calls between one another. For instance, program P includes a module Pa (204) and a module Pb (206), which are of different classes. As examples, Pa (204) uses calling convention A and is a 31-bit module, and Pb (206) uses calling convention B and is other than a 31-bit module, such as a 64-bit module. That is, module Pa uses, for instance, 31-bit registers, addresses and/or address buses, and module Pb uses, for instance, 64-bit registers, addresses and/or address buses. The compiler, such as compiler 125, generates modules Pa and Pb, which will run in separate processes within the same address space. This includes, in one example, employing separate task control blocks (TCBs).

The main entry point of program P is either Pa or Pb. In this example, Pa is the main entry point; however, in other examples, it is Pb. In accordance with an aspect of the present invention, when Pa starts, the compiler allocates concurrency primitives, such as Event Control Blocks (ECBs) or semaphores, and storage to be used to send messages between Pa and Pb. It also causes Pb to start, and when Pb starts it will be waiting for a message from Pa.

Further details regarding modules (e.g., Pa and Pb) running in a single address space and communication between them are described with reference to FIGS. 3A-3F. In the examples described below, Pa is a 31-bit COBOL module and Pb is a 64-bit Java module. However, other classes and/or languages may be used. Further, the processing of FIGS. 3A-3F is performed by at least one processor, such as processor 114.

Figure 3A:
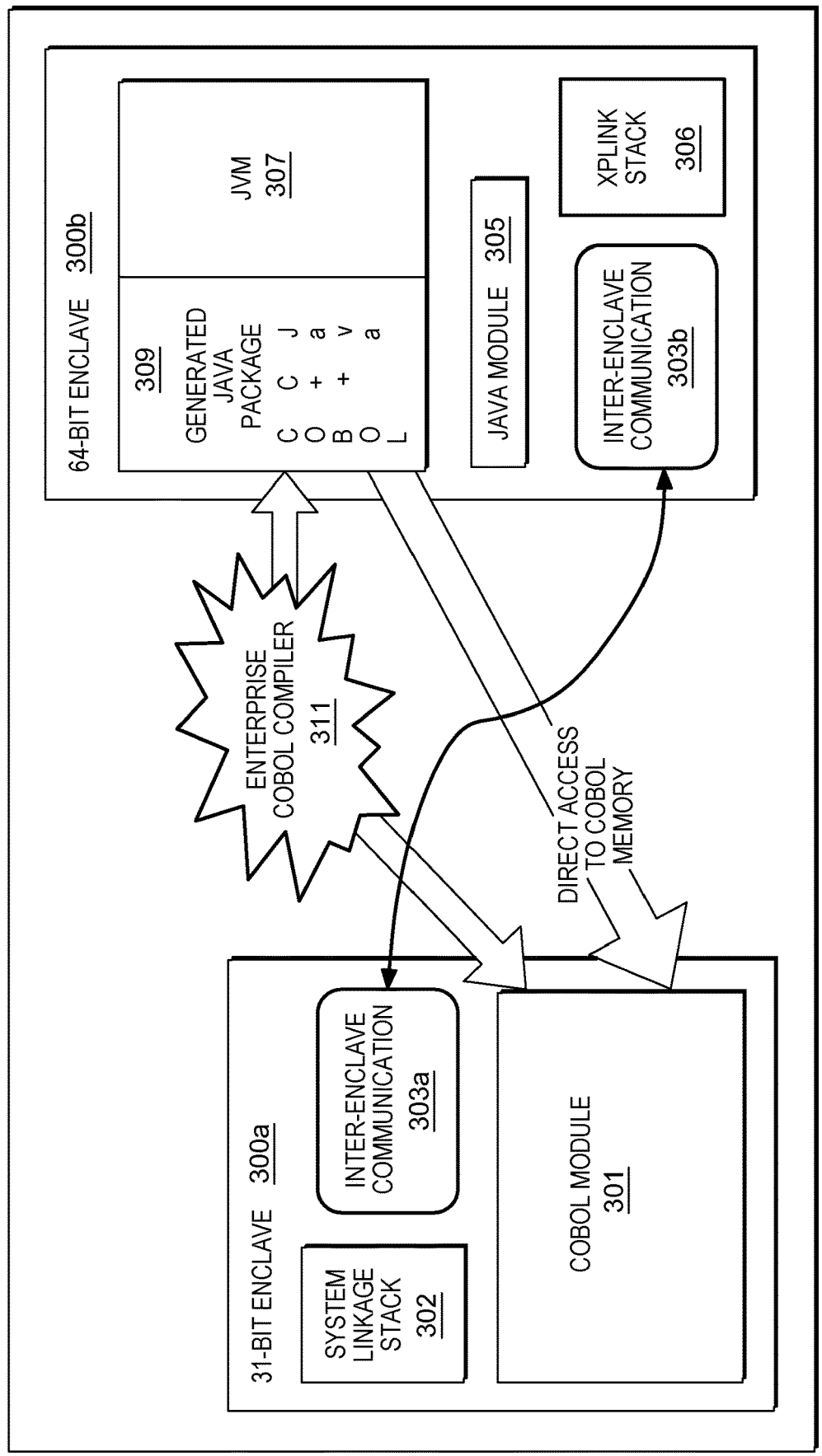
FIGS. 3A-3F depict one example of inter-process communication within an address space, in accordance with an aspect of the present invention.

In one example, referring to FIG. 3A, address space 200 includes a plurality of processes, such as a plurality of enclaves, e.g., enclave 300a and enclave 300b, in which modules run. An enclave is a logical runtime structure that supports the execution of modules, procedures, etc. In one example, enclaves 300a, 300b are enclaves of the Language Environment® runtime environment, offered by International Business Machines Corporation, Armonk, N.Y. The Language Environment runtime environment is a runtime environment used by, for instance, the z/OS operating system. It establishes a common runtime environment for all participating high-level languages (HLLs), and combines runtime services, such as routines for runtime message handling, condition handling, and storage management. Those services are available through a set of interfaces that are consistent across the programming languages.

In one example, enclave 300a is for modules of one class (e.g., 31-bit) and enclave 300b is for modules of another class (e.g., 64-bit). That is, enclave 300a is used for 31-bit processing (e.g., for COBOL modules or other modules that use 31-bit processing) and enclave 300b is for 64-bit processing (e.g., for Java modules or other modules that use 64-bit processing). Although enclaves for 31-bit and 64-bit processing are used as examples, in other embodiments, enclaves that handle other bit-sized modules, processing and/or other types of classes may be used. Further, there may be more than two enclaves within an address space.

As one particular example, enclave 300a is used to run a COBOL module, such as COBOL module 301, and therefore, is referred to herein for simplicity as the COBOL enclave; and enclave 300b is used to run a Java module, such as Java module 305, and therefore, is referred to herein for simplicity as the Java enclave. The Java enclave may include a stand-alone program or a program running in a system, such as the IMS™ (Information Management System) system or CICS® (Customer Information Control System) system offered by International Business Machines Corporation, Armonk, N.Y.

In one example, enclave 300a includes a system linkage stack 302 and an inter-enclave communication mechanism 303a generated by a compiler (e.g., compiler 125, such as Enterprise COBOL compiler 311). Further, in one example, enclave 300b includes an XPLINK (Extra Performance Linkage) stack 306, a Java virtual machine (JVM) 307 used to run Java bytecodes produced from compiling Java modules, such as Java module 305, and an inter-enclave communication mechanism 303b generated by the compiler (e.g., compiler 311). Inter-enclave communication mechanisms 303a, 303b include, for instance, communication objects, such as pairs of synchronization objects, including, but not limited to, ECBs, semaphores, Pause elements, etc., and corresponding primitives, such as POST, WAIT, Pause, Release, etc. used to synchronize communication between the enclaves. In one example, each side POSTs to an ECB, which is WAITed on by the other side, as described further below. The compiler, e.g., compiler 311, generates the communication objects to be used when one module calls another module. These communication objects are used instead of generated procedure calls to communicate between the modules.

Further, in one embodiment, the compiler is responsible for compiling modules consistent with the language of the compiler, and in accordance with an aspect of the present invention, for generating a generated language package. In this particular example, the compiler is a COBOL compiler, such as compiler 311, and the language for the generated package is Java. Therefore, compiler 311 compiles COBOL module 301 and generates generated Java package 309. As an example, generated Java package 309 has direct access to COBOL memory, and is used, for instance, to access COBOL data from Java, to call COBOL from Java and/or to call Java from COBOL. The package includes, for instance, generated Java and generated COBOL (and, in a further example, generated C++), and the native elements of the package are dynamically linked libraries (DLL).

Although COBOL and Java are used as examples herein, these are only examples. The compiler may be other language compilers and/or the generated language package may be for other languages. Many variations exist.

In one example, to access COBOL data from Java, generated Java package 309 provides getters and setters, wrapped in Java classes. Further, in one example, the compiler, e.g., COBOL compiler 311, includes in generated Java package 309 access methods to COBOL structures (e.g., elementary data items, including those in tables; which are declared, e.g., as PIC or USAGE). In one instance, a user-specified compiler directive is employed on a group that indicates that the compiler should generate the package elements, to avoid generating excessively large Java packages. The compiler computes a web of groups with Occurs Depending On relationships.

Additionally, in one example, there is data conversion between Java and COBOL data types. In an example, Package.Group.set(JavaObject) is added for a get. This finds names of fields in the Java object that match names of data items in the COBOL group and assigns corresponding fields/data items. Certain sections are or may be supported. For instance, Working-Storage is supported; a Linkage section may be supported—ability to create a new group to be passed in on a call to COBOL is supported; and File section, External and/or Special Registers may be supported.

Examples of COBOL code and Java code corresponding thereto are listed below:

```
COBOL
PROGRAM-ID ACOBOLProgram.
WORKING-STORAGE SECTION.
1    Person.
     2    Name.
          3    First    PIC X(10).
          3    Last     PIC X(10).
     2    ID       PIC 9(5)    COMP-5.
Java
Import com.ibm.COBOL.*;
{
    String first = ACOBOLProgram.Person.Name.First.getAsString( );
    ACOBOLProgram.Person.Name.Last.set (new String("Name"));
    int id = ACOBOLProgram.Person.ID.get( );
}
```

Further, in one embodiment, to call COBOL from Java, generated Java package 309 includes Java package support calls, and creates concrete linkage section items below the bar (e.g., below the maximum address seen by the 31-bit modules). Example linkage sections for COBOL and Java are listed below:

```
COBOL
PROGRAM-ID Prog2.
LINKAGE SECTION.
1    Person.
     2    Name.
          3    First    PIC X(10).
          3    Last     PIC X(10).
1    ID       PIC 9(5)    COMP-5.
1    rc       PIC S9(5)   COMP-5.
Java
Import com.ibm.COBOL.*;
{
Prog2.Linkage.Person concretePerson = new Prog2.Linkage.Person( );
// initialize data items in "concretePerson" as before
Prog2.Linkage.ID concreteID = new Prog2.Linkage.ID ( );
concreteID.set (12);
int rc = Prog2.call (concretePerson, concreteID);
}
```

In one example, to call COBOL from Java, the target of the call is to be a module that is dynamically callable and DLL callable. If a linkage section item includes a data item and is passed by value, the Java module can either create a simple linkage section item and initialize it with Java data or pass the Java data item directly. The COBOL module can pass the linkage section item to called sub-modules. The COBOL module may not record the address of the linkage section item for any use after the called module returns. A compiler option (or possibly directive) is employed to trigger creation of a Java package element.

Moreover, in one embodiment, to call Java from COBOL, Java targets are identified in the Repository section, an example of which is depicted below:
Configuration Section.
Repository.

Java Static Method CountChars Is
    "com.ibm.JPackage.MyClass.CountChars(Ljava/lang/String;) I".
Java Method UpdateString Is
    "com.ibm.JPackage.MyClass.UpdateString(Ljava/lang/String;) V".

The Java targets are called using Invoke, examples of which are as follows:
Procedure Division.
INVOKE CountChars USING MYPICX RETURNING RC
INVOKE UpdateString ON MYJREFERENCE USING A-STRING In one embodiment, the JREFERENCE type is 64 bits (compiled COBOL works with 31-bit or 64-bit Java) and is a JNI (Java native interface) global reference. When methods in the generated Java package are used to set the Working-Storage Section or Linkage Section JREFERENCE data items, the setter will DeleteGlobalReference, if the data item is not null and set the data items to NewGlobalReference. As examples, JREFERENCE types are allowed as USING BY VALUE on calls and invokes, and in an ON clause of invoke.

To call Java from COBOL, in one embodiment, the COBOL compiler checks the Java method signature (provided in the Repository section) and compares it to the actual arguments and return type specified. It will coerce the specified arguments into the expected parameter types. That is, it will transform the COBOL argument into something consumable by Java. This may result in compilation errors. For example, there may be a compilation error, if the Java method takes an integer and the data item passed in is PIC A. The compiler produces a message if it detects that a different COBOL data type would have required less effort to convert. By specifying the most appropriate type early minimizes the cost of the call to the Java method.

In addition to the above, COBOL and Java may make reciprocal calls. In one embodiment, the COBOL source is compiled, and the Java package is generated using a new compiler option to ignore references to Java methods in the COBOL module. The Java class is then compiled and a javap command is run. The call to the Java method is fully elaborated in the COBOL module, and the COBOL module is recompiled, which does not change the generated package. Other variations are possible.

Figure 3B:
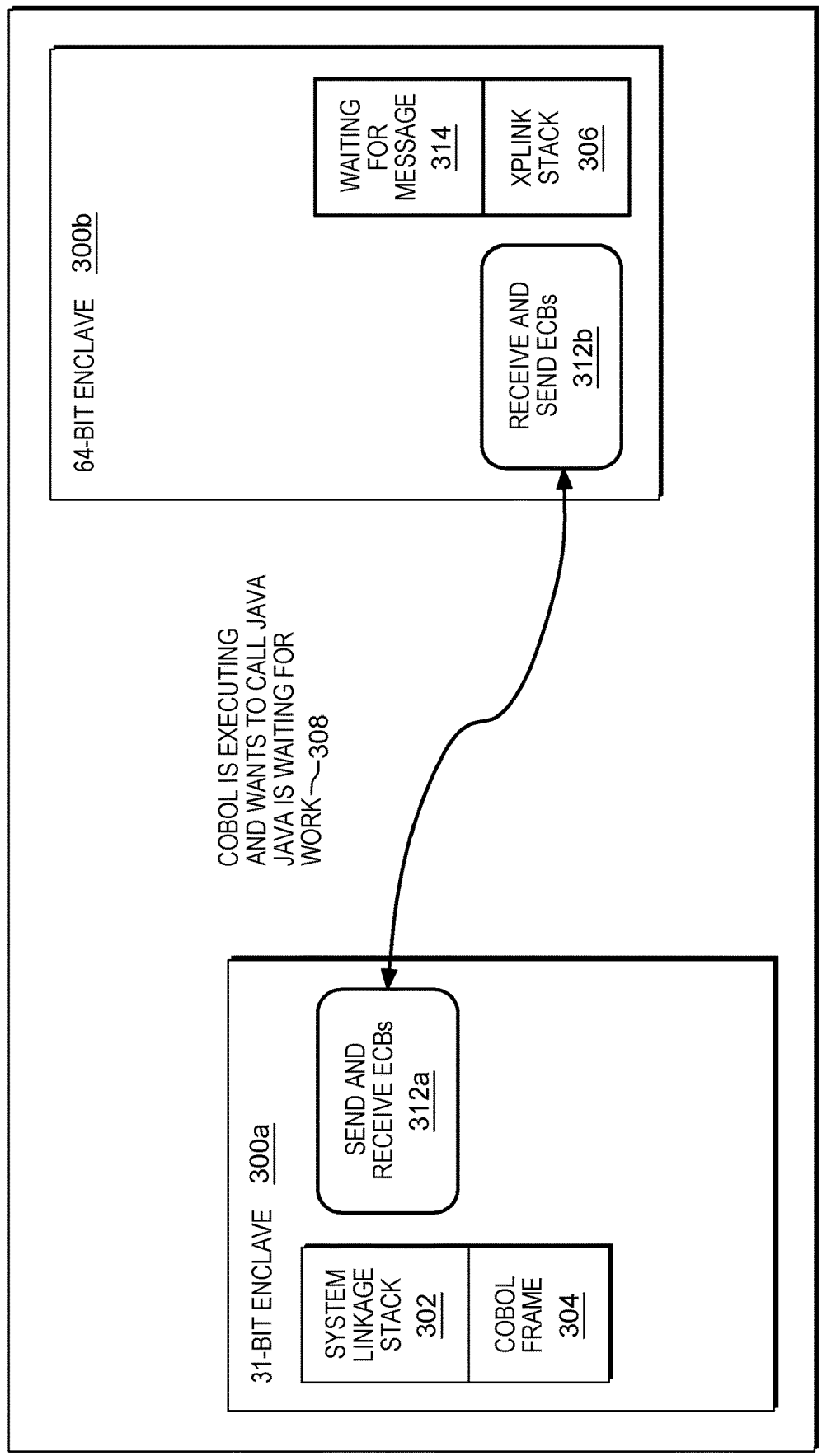

Further details relating to the compiler generated inter-process communication between different class modules running in the same address space are described with reference to FIGS. 3B-3F. Referring initially to FIG. 3B, a COBOL module is executing and wants to call Java and Java is waiting for work, STEP 308. Based on executing a COBOL module, a COBOL frame 304 is placed on linkage stack 302. Additionally, in one example, a waiting for message 314 is placed on XPLINK stack 306. Further, in one example, enclave 300a communicates with enclave 300b by employing send and receive ECBs 312a, 312b, as part of inter-enclave communication mechanisms 303a, 303b. For instance, the side that is waiting (e.g., 314) WAITs, monitoring an ECB. The side that sends a message (e.g., 312a) POSTs on the ECB.

In one example, for each call point to Java in the COBOL program, the compiler generates a corresponding call in the generated package. That is, the generated Java package includes an element corresponding to the call, which is used to call a Java method. When the package is compiled, the call is compiled, e.g., in 64-bit, XPLINK (its natural form). When the 31-bit COBOL wants to call Java, it sends a message to the 64-bit thread to which it is connected indicating which call should be executed. Meanwhile, the 64-bit thread is waiting for such a message. Based on receiving the message, it will call an appropriate Java method (corresponding to the call) using XPLINK, and send a message back when the call returns. Thus, to perform the call, instead of using a procedure call, a message is sent from one enclave (e.g., the COBOL enclave) to the other enclave (e.g., Java enclave). The package selects a compiler-generated element corresponding to the call. This allows the call to be performed by using the compiler-generated inter-process communication and without changing or re-compiling the modules.

Moreover, as described herein, the COBOL compiler checks the Java method signature (provided in the Repository section) and compares it to the actual arguments and return type specified. It will coerce the specified arguments into the expected parameter types. That is, it will transform the COBOL argument into something consumable by Java. For example, a COBOL PIC S9(5) data item is transformed into a Java int (integer) item. Other examples are possible.

Figure 3C:
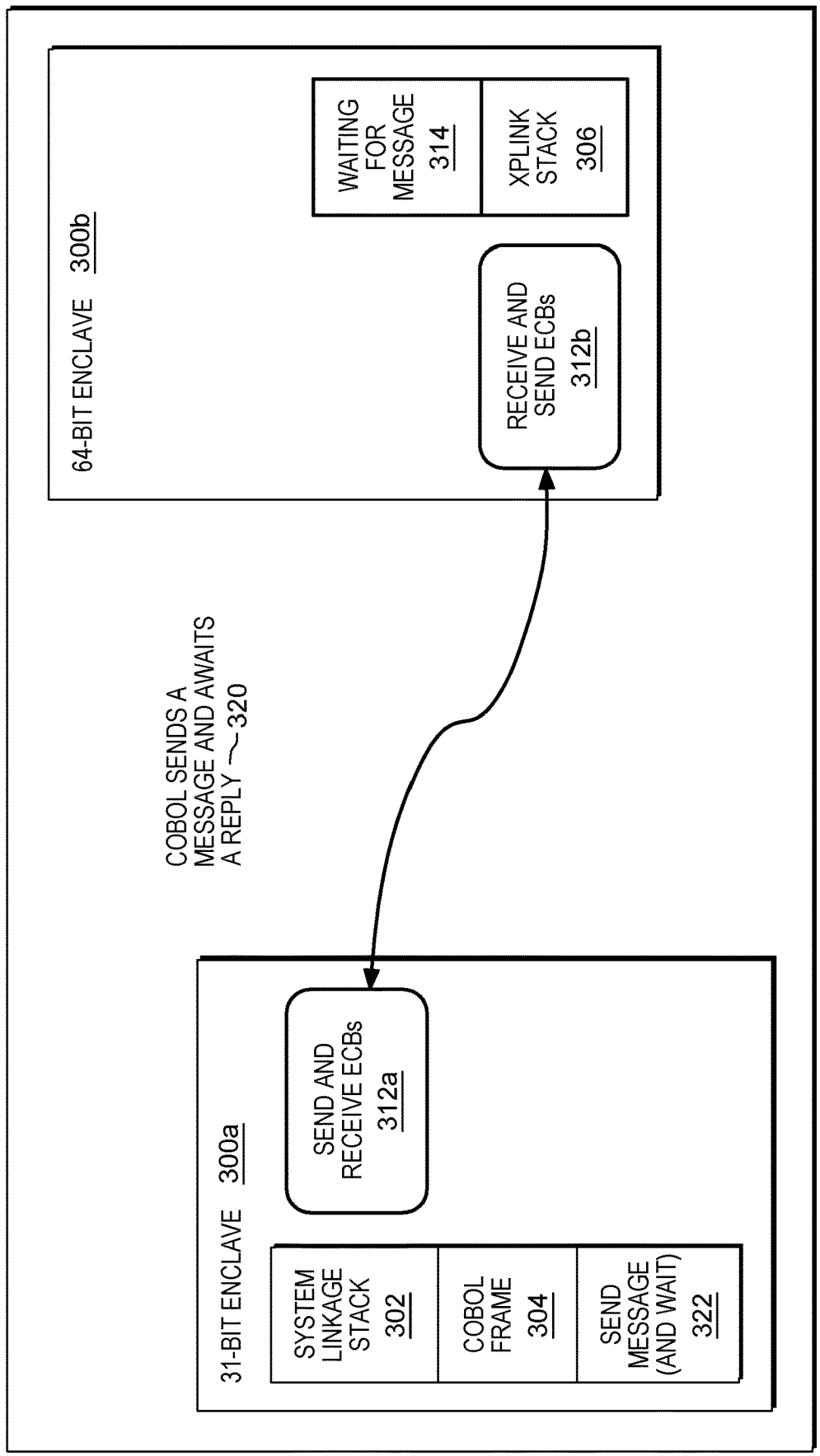
Figure 3D:
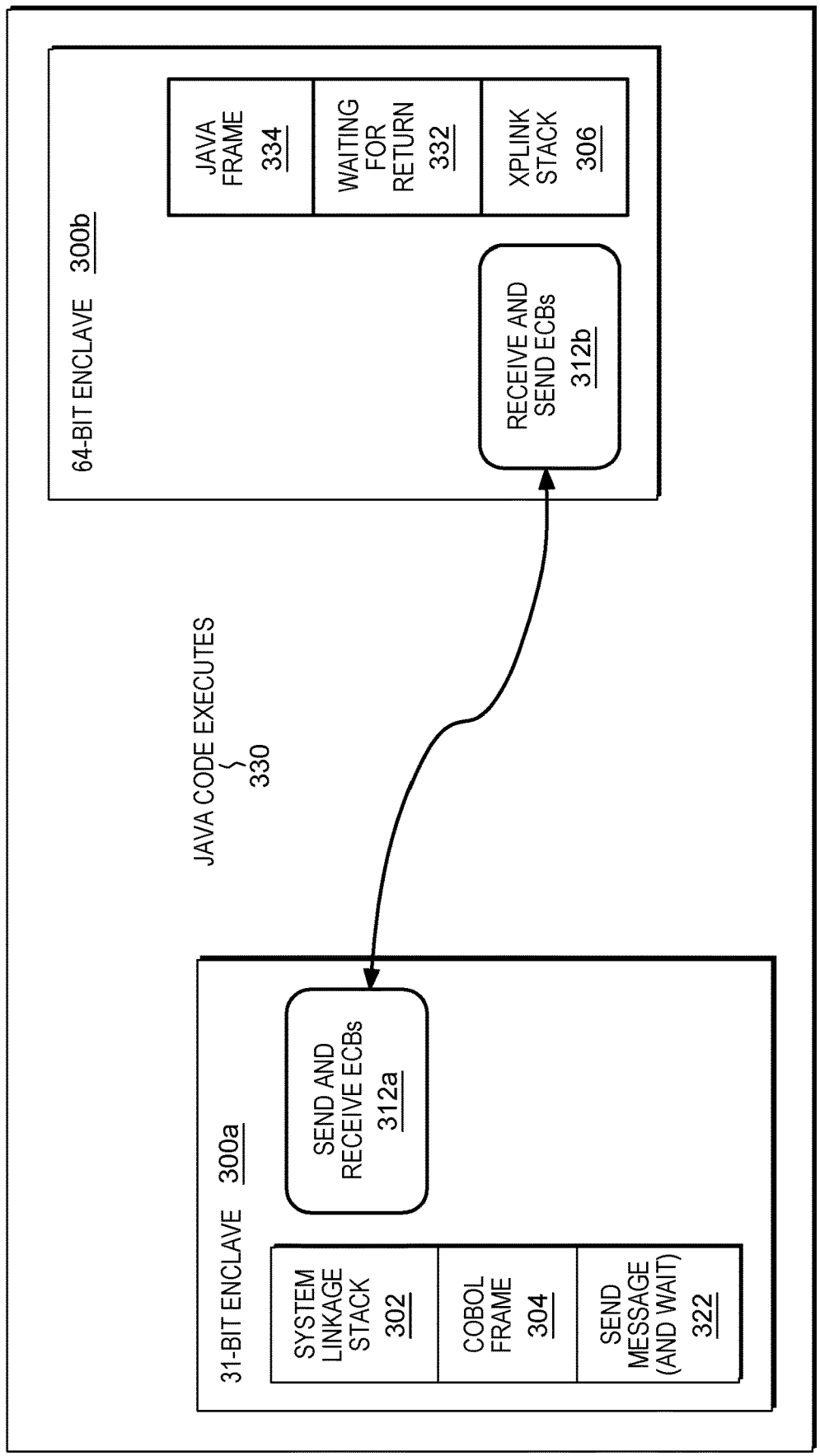
Figure 3E:
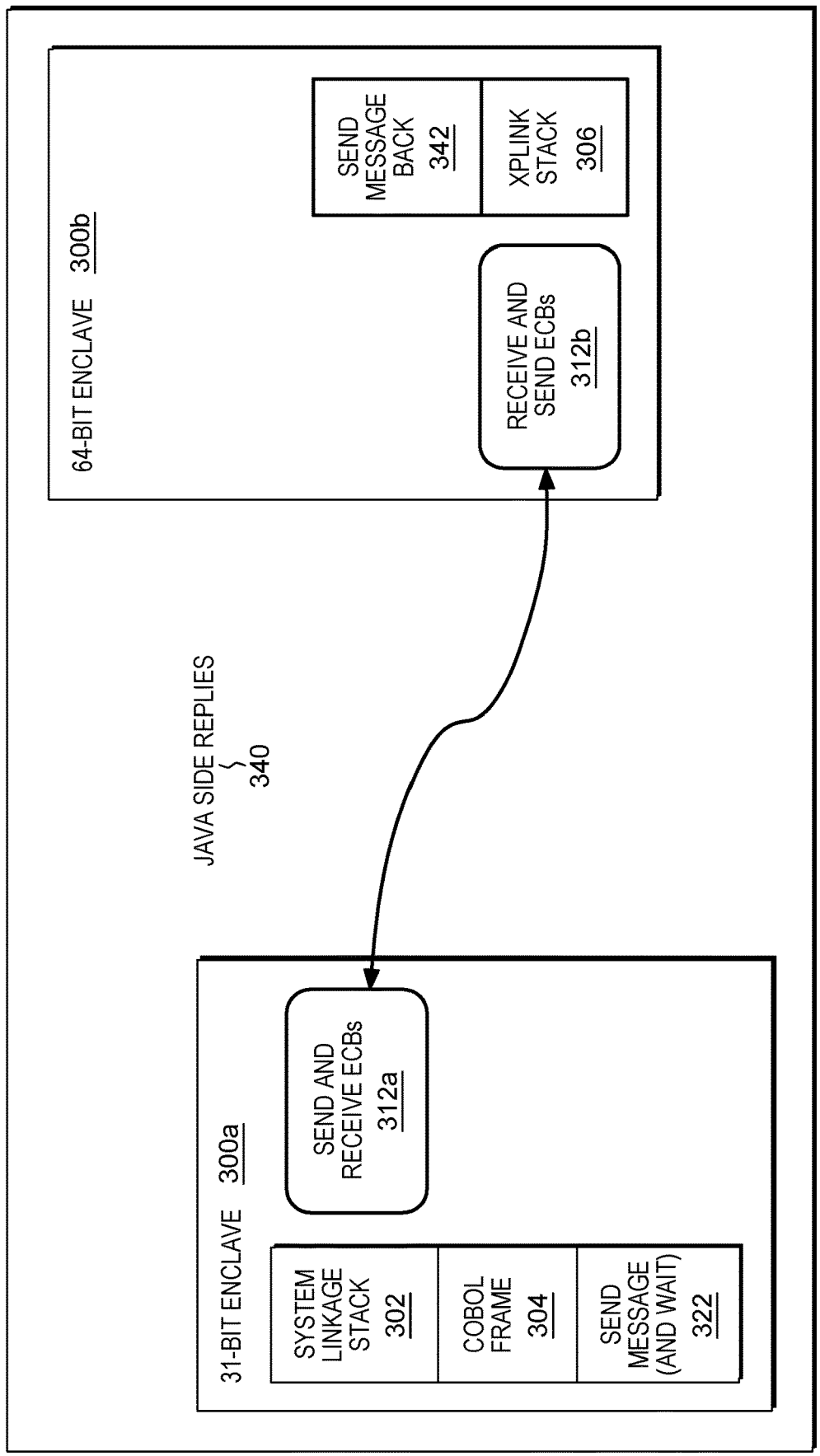

Referring to FIG. 3C, the COBOL module sends a message and waits for a reply, STEP 320. The message is placed 322 on system link stack 302. Further, as depicted in FIG. 3D, the Java module code executes, STEP 330, based on receiving the message. This includes, e.g., calling the appropriate Java method using XPLINK, and waiting for the call to return. A wait for return 332 is placed on stack 306, as well as a Java frame 334. Then, referring to FIG. 3E, the Java side replies, STEP 340, removing the waiting for return 332 and Java frame 334 from the stack, and placing a send message back 342 on stack 306. As examples, the reply includes a work complete message, a reply message indicating the one module (e.g., COBOL) is to perform work so that the other module (e.g., Java) can complete its work, or an exception or failure message.

Figure 3F:
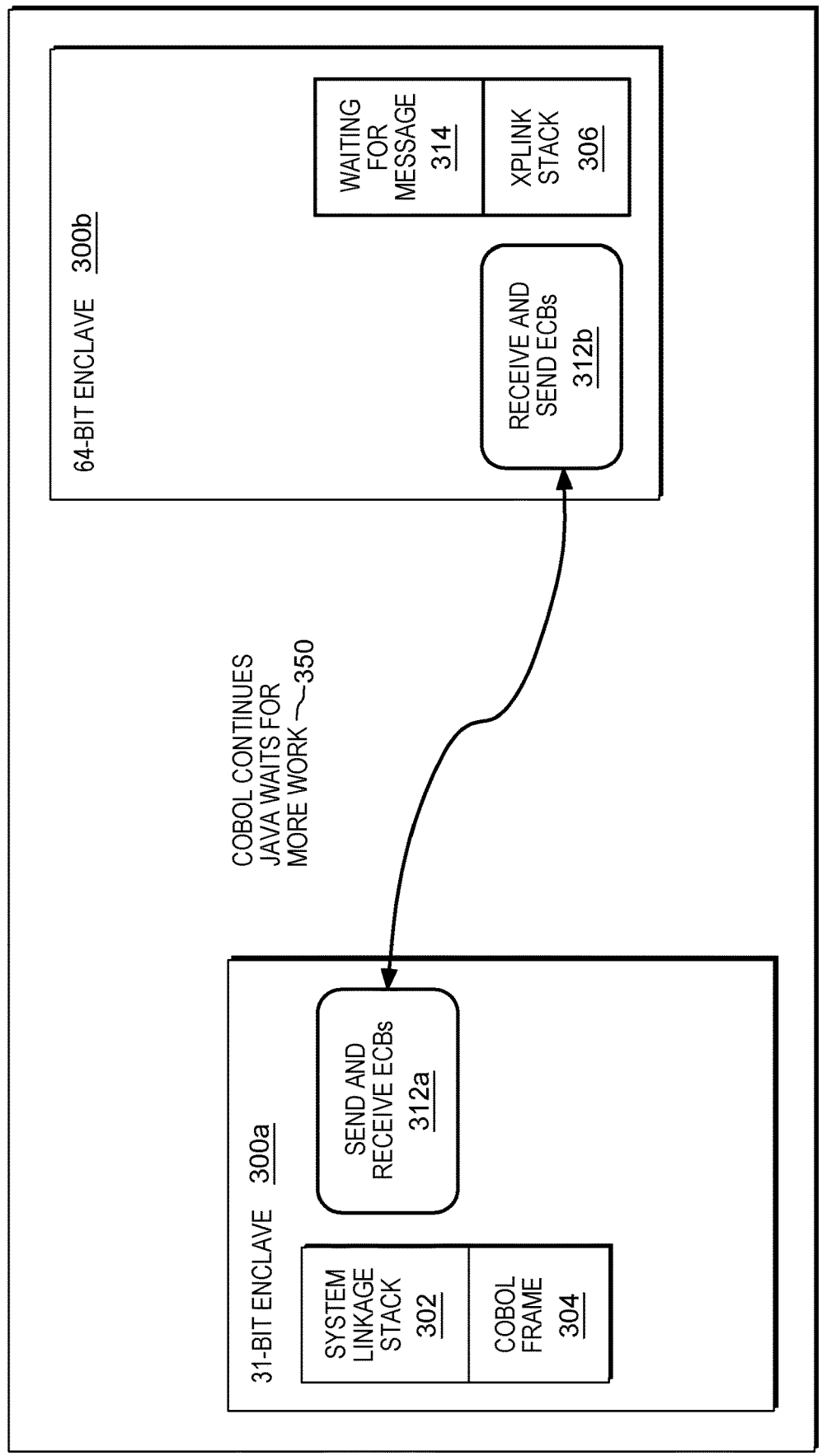

Thereafter, as depicted in FIG. 3F, the COBOL side continues and the Java side waits for more work, STEP 350. The send message (and wait) 322 is removed from stack 302 and waiting for message 314 is placed on stack 306.

As described above, one or more aspects allow communication between one class of modules (e.g., 31-bit COBOL) and another class of modules (e.g., 64-bit Java) when they are both in the same address space. Compiler technology calls a target directly in its natural linkage convention, and neither side has to switch linkage convention mode. The communication is provided via the compiler, absent user knowledge, in one embodiment, and without additional tools.

Although enclaves, and in particular LE enclaves, are provided as an example of processes in which modules are to run, other types of processes or other enclaves may be used without departing from one or more aspects of the present invention. Further, although the enclaves described herein include a 31-bit COBOL enclave and a 64-bit Java enclave, other examples may be used including, but not limited to, other bit-sized enclaves and/or enclaves that are for other types or classes of programs/modules.

As described above, in one or more aspects, for each call point to Java in the COBOL module, the compiler generates a corresponding call in the generated package. When the package is compiled, the call is compiled, e.g., in 64-bit, XPLINK (its natural form). When the 31-bit COBOL wants to call Java, it sends a message to the 64-bit thread to which it is connected indicating which call should be executed. Meanwhile, the 64-bit thread is waiting for such a message. Based on receiving the message, it will call the appropriate Java method using, e.g., XPLINK, and send a message back when the call returns. Further, for Java to call COBOL, a package is generated by the COBOL compiler that supports creating linkage section items below the bar, populating the linkage section items, and a call method to call the COBOL module. The call method, which was generated by the COBOL compiler, allocates, e.g., a "type 1" linkage area and populates it, and sends a message to the 31-bit COBOL thread to which it is connected indicating that a call should be made. Further, the 31-bit thread is waiting for such a message. This thread, in one example, has called a Java method and is now waiting for a message. Based on receiving the message, it calls the appropriate method in the "type 1" style and sends a message back when the call returns.

One or more aspects of the present invention are inextricably tied to computer technology and facilitate processing within a computer, improving performance thereof. In one or more aspects, processing within the computer is improved by allowing different classes of modules to communicate without requiring user-defined software modules or changes to code or primitives. By using compiler-defined intercommunication mechanisms, processing speed within the computer is increased and performance is improved.

One particular example of facilitating processing within a computing environment, as it relates to one or more aspects of the present invention, is described with reference to FIGS. 4A-4B. In one example, with reference to FIG. 4A, a package generated by a compiler of the computing environment to be used in inter-process communication between one module and another module running in a single address space of the computing environment is obtained (400). The package includes one or more data conversions of data between the one module and the other module (402). The one module is one class of module and the other module is another class of module, the one class of module being different from the other class of module (404). In one example, the compiler is of a language of the one module (406). The one module calls the other module using the inter-process communication (408). The inter-process communication includes one or more communication objects generated by the compiler and used in place of one or more procedure calls to communicate between the one module and the other module (410). The inter-process communication employs the package generated by the compiler (411). Based on calling the other module, one or more operations are performed by the other module (412).

In one embodiment, one or more operations are performed by the one module (414). The one or more operations include, for instance, calling the other module by the one module (416); the other module is in a wait state (418). Based on calling the other module, the one module is placed in a wait state (420).

As an example, the one module and the other module behave logically as a single program, in that based on one of the one module or the other module performing work, the other of the one module or the other module is waiting (422).

In a further aspect, referring to FIG. 4B, based on the other module performing at least one operation of the one or more operations, a reply is sent from the other module to the one module (430). The reply includes, for instance, a work complete message, a reply message indicating the one module is to perform work so that the other module can complete its work, or an exception or failure message (432).

As one example, the calling the other module includes issuing, by the one module, a message to the other module indicating the other module is to begin executing work (434). The issuing the message including, for instance, performing a post to a synchronization object of the one or more communication objects (436).

Further, as examples, the one class of module performs processing using one size of addresses and the other class of module performs processing using another size of addresses (438). In yet further examples, the one class of module is different from the other class of module based on the one class of module and the other class of module having different addressing modes, different bit-sized modules, different programming languages, different calling conventions, different linkage conventions or different execution properties (440).

In one example, the package includes one or more access methods to one or more structures associated with the one module (442). In another example, the package includes one or more support calls for the other module (444).

Other variations and embodiments are possible.

Figure 5A:
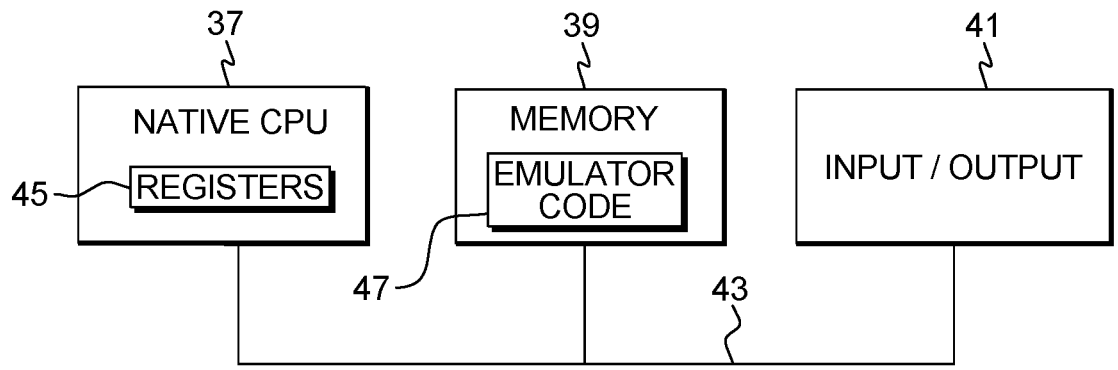
FIG. 5A depicts another example of a computing environment to incorporate and use one or more aspects of the present invention.

Other types of computing environments may also incorporate and use one or more aspects of the present invention, including, but not limited to, emulation environments, an example of which is described with reference to FIG. 5A. In this example, a computing environment 35 includes, for instance, a native central processing unit (CPU) 37, a memory 39, and one or more input/output devices and/or interfaces 41 coupled to one another via, for example, one or more buses 43 and/or other connections. As examples, computing environment 35 may include a PowerPC® processor offered by International Business Machines Corporation, Armonk, N.Y.; and/or other machines based on architectures offered by International Business Machines Corporation, Intel Corporation, or other companies. IBM, z/Architecture, z/OS, MVS, PowerPC, CICS, IMS and Language Environment are registered trademarks or trademarks of International Business Machines Corporation in at least one jurisdiction.

Native central processing unit 37 includes one or more native registers 45, such as one or more general purpose registers and/or one or more special purpose registers used during processing within the environment. These registers include information that represents the state of the environment at any particular point in time.

Moreover, native central processing unit 37 executes instructions and code that are stored in memory 39. In one particular example, the central processing unit executes emulator code 47 stored in memory 39. This code enables the computing environment configured in one architecture to emulate another architecture. For instance, emulator code 47 allows machines based on architectures other than the z/Architecture hardware architecture, such as PowerPC processors, or other servers or processors, to emulate the z/Architecture hardware architecture and to execute software and instructions developed based on the z/Architecture hardware architecture.

Figure 5B:
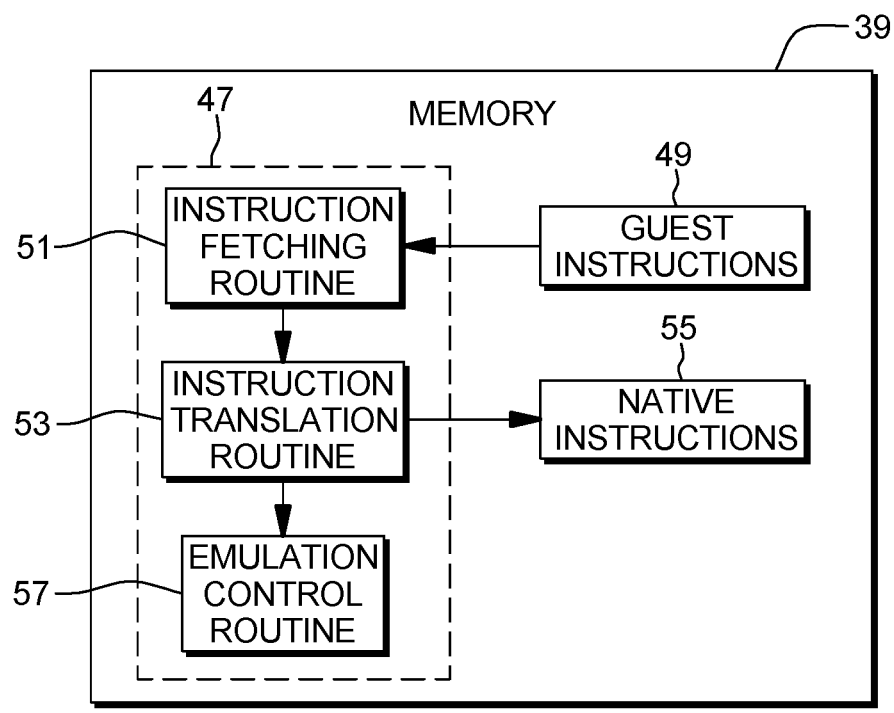
FIG. 5B depicts further details of the memory of FIG. 5A.

Further details relating to emulator code 47 are described with reference to FIG. 5B. Guest instructions 49 stored in memory 39 comprise software instructions (e.g., correlating to machine instructions) that were developed to be executed in an architecture other than that of native CPU 37. For example, guest instructions 49 may have been designed to execute on a processor based on the z/Architecture hardware architecture, but instead, are being emulated on native CPU 37, which may be, for example, an Intel processor. In one example, emulator code 47 includes an instruction fetching routine 51 to obtain one or more guest instructions 49 from memory 39, and to optionally provide local buffering for the instructions obtained. It also includes an instruction translation routine 53 to determine the type of guest instruction that has been obtained and to translate the guest instruction into one or more corresponding native instructions 55. This translation includes, for instance, identifying the function to be performed by the guest instruction and choosing the native instruction(s) to perform that function. Intel is a trademark or registered trademark of Intel Corporation or its subsidiaries in the United States and other countries.

Further, emulator code 47 includes an emulation control routine 57 to cause the native instructions to be executed. Emulation control routine 57 may cause native CPU 37 to execute a routine of native instructions that emulate one or more previously obtained guest instructions and, at the conclusion of such execution, return control to the instruction fetch routine to emulate the obtaining of the next guest instruction or a group of guest instructions. Execution of native instructions 55 may include loading data into a register from memory 39; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 45 of the native CPU or by using locations in memory 39. In embodiments, guest instructions 49, native instructions 55 and emulator code 37 may reside in the same memory or may be disbursed among different memory devices.

As used herein, firmware includes, e.g., the microcode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

A guest instruction 49 that is obtained, translated and executed may be, for instance, one of the instructions described herein. The instruction, which is of one architecture, is fetched from memory, translated and represented as a sequence of native instructions 55 of another architecture. These native instructions are then executed.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
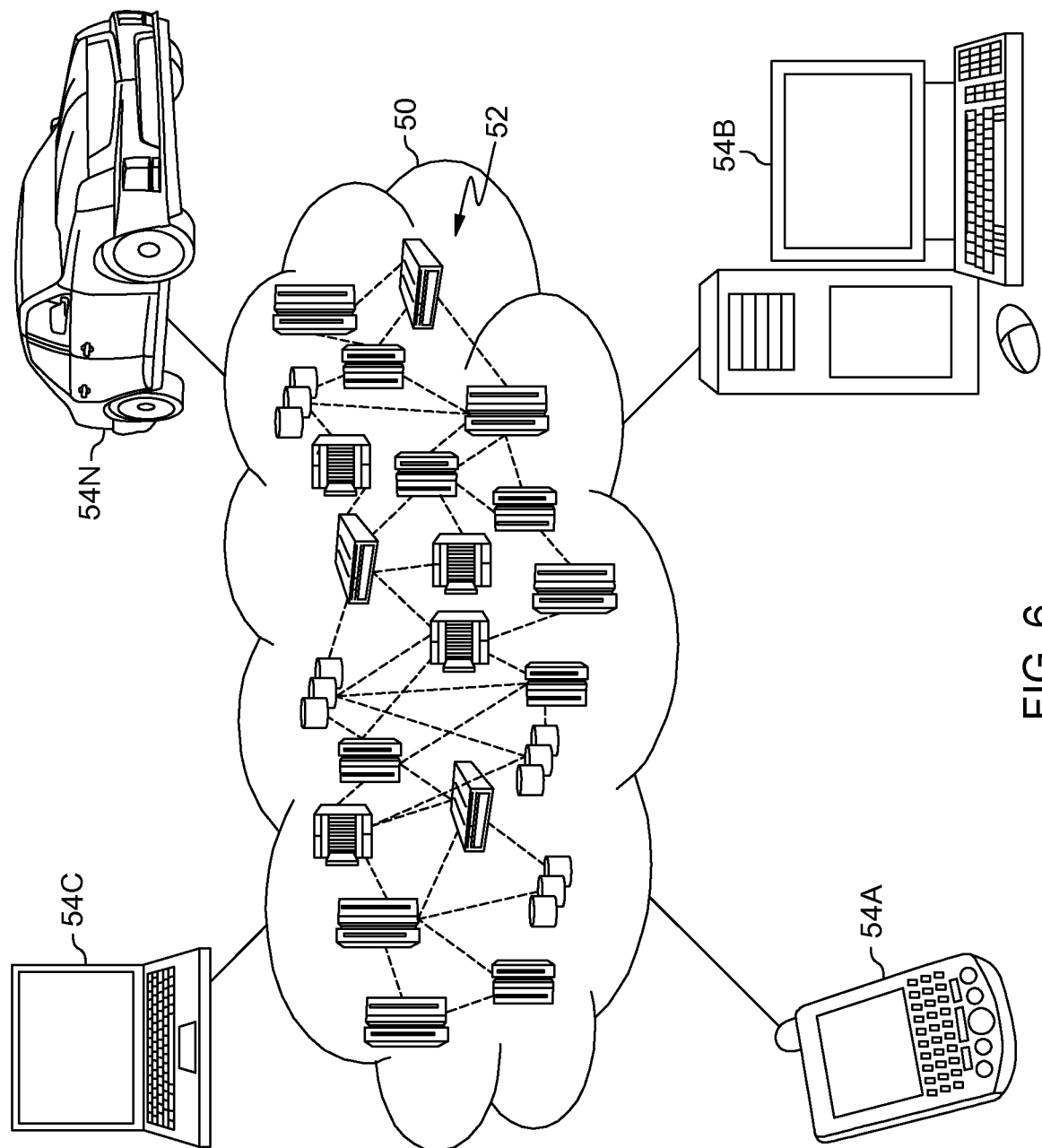
FIG. 6 depicts one embodiment of a cloud computing environment.

Referring now to FIG. 6, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 52 and cloud computing environment 50 can communicate with any type of computerized device over any type of network and/or network addressable connection (e.g., using a web browser).

Figure 7:
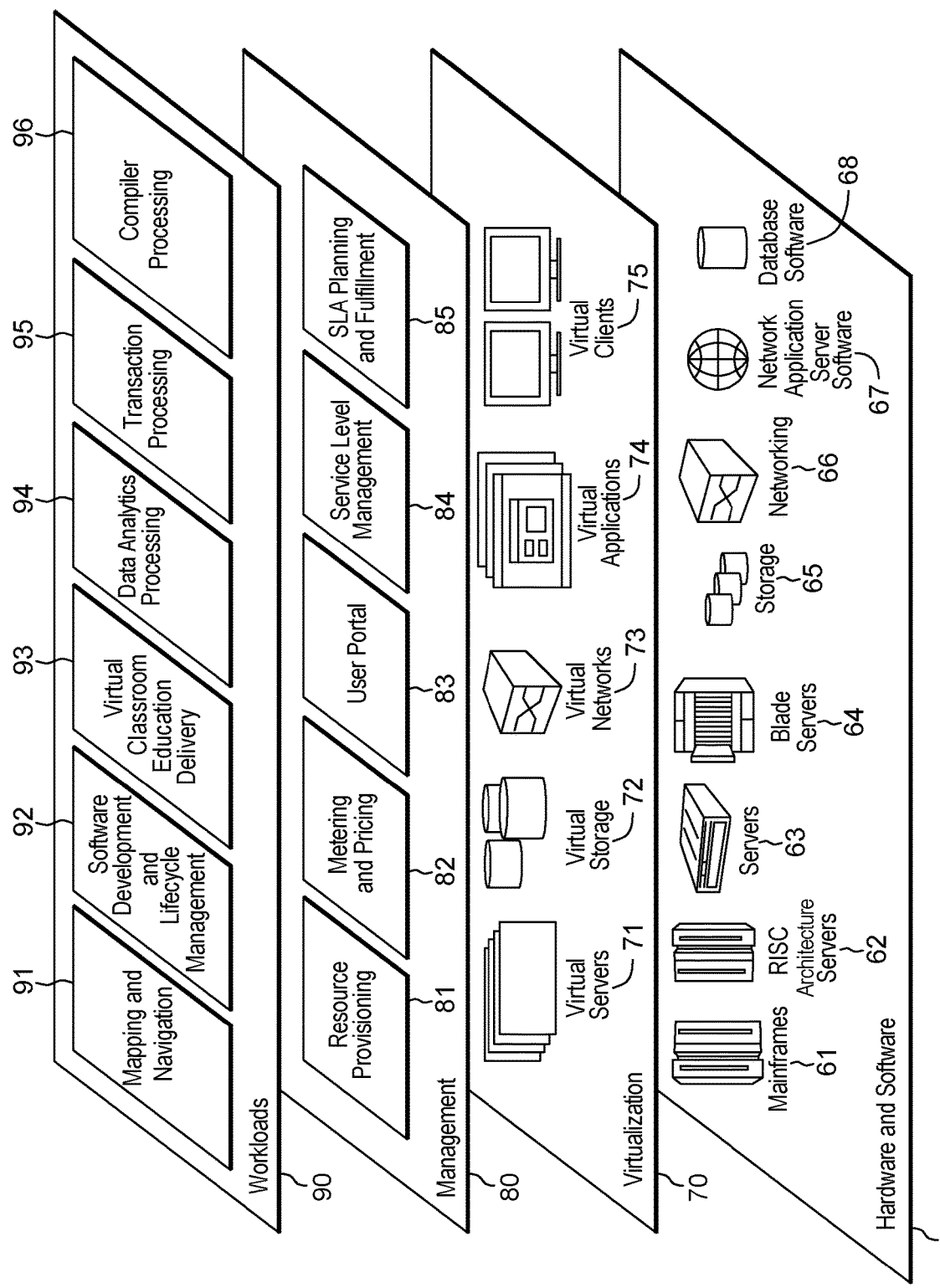
FIG. 7 depicts one example of abstraction model layers.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and compiler processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who ioffers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions or operations may be used. Additionally, different classes of programs, including different bit-sized applications and/or different programming languages may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing using compiler-defined inter-process communication mechanisms within a computing environment, the computer program product comprising:
a computer readable storage medium readable by a processor and storing instructions for performing a method comprising:
replacing a generated procedure call between one module and another module with an inter-process communication, absent using user-defined software structures, including:
obtaining a package generated by a compiler of the computing environment to be used in inter-process communication between the one module and the other module, which are running in different memory enclaves in a single address space of the computing environment, wherein the package includes a corresponding inter-process communication call to be used in place of the generated procedure call, wherein the corresponding inter-process communication call is generated by the compiler absent using user-defined software structures, and absent recompiling the one module and the other module, wherein the package includes one or more data conversions of data between the one module and the other module, wherein the one module is one class of module in one memory enclave of the different memory enclaves, wherein the other module is another class of module in another memory enclave of the different memory enclaves, wherein the one class of module is different from the other class of module, wherein the compiler is of a language of the one module, and wherein the different memory enclaves are different logical runtime structures that support the execution of different classes of modules;
calling, by the one module, the other module using the inter-process communication, wherein calling the other module includes the compiler checking a method signature of the other modules in a repository section and comparing the method signature with actual arguments and return types satisfied to determine whether a compilation error has occurred, wherein the inter-process communication includes one or more communication objects comprising pairs of synchronization objects and corresponding primitives used to synchronize communication between the different memory enclaves, wherein the one or more communication objects are generated by the compiler and used in place of the generated procedure call to communicate between the one module and the other module, and wherein the inter-process communication employs the package generated by the compiler; and
performing, based on calling the other module, one or more operations by the other module.

2. The computer program product of claim 1, wherein the method further comprises:
performing one or more operations by the one module, wherein the other module is in a wait state, the one or more operations including the calling the other module by the one module; and
wherein based on calling the other module, the one module is placed in a wait state.

3. The computer program product of claim 2, wherein the one module and the other module behave logically as a single program, in that based on one of the one module or the other module performing work, the other of the one module or the other module is waiting.

4. The computer program product of claim 1, wherein the method further comprises sending a reply from the other module to the one module, based on the other module performing at least one operation of the one or more operations.

5. The computer program product of claim 4, wherein the reply includes a message selected from a group of messages consisting of: a work complete message, a reply message indicating the one module is to perform work so that the other module can complete its work, and an exception or failure message.

6. The computer program product of claim 1, wherein the calling the other module includes issuing, by the one module, a message to the other module indicating the other module is to begin executing work, the issuing the message including performing a post to a synchronization object of the one or more communication objects.

7. The computer program product of claim 1, wherein the one class of module performs processing using one size of addresses and the other class of module performs processing using another size of addresses.

8. The computer program product of claim 1, wherein the one class of module is different from the other class of module based on the one class of module and the other class of module having an attribute selected from a group of attributes consisting of: different addressing modes, different bit-sized modules, different programming languages, different calling conventions, different linkage conventions and different execution properties.

9. The computer program product of claim 1, wherein the package includes one or more access methods to one or more structures associated with the one module.

10. The computer program product of claim 1, wherein the package includes one or more support calls for the other module.

11. A computer system for facilitating processing within a computing environment, the computer system comprising:
a memory; and
a processor in communication with the memory, wherein the computer system is configured to perform a method comprising:
replacing a generated procedure call between one module and another module with an inter-process communication, absent using user-defined software structures, including:
obtaining a package generated by a compiler of the computing environment to be used in inter-process communication between the one module and the other module, which are running in different memory enclaves in a single address space of the computing environment, wherein the package includes a corresponding inter-process communication call to be used in place of the generated procedure call, wherein the corresponding inter-process communication call is generated by the compiler absent using user-defined software structures, and absent recompiling the one module and the other module, wherein the package includes one or more data conversions of data between the one module and the other module, wherein the one module is one class of module in one memory enclave of the different memory enclaves, wherein the other module is another class of module in another memory enclave of the different memory enclaves, wherein the one class of module is different from the other class of module, wherein the compiler is of a language of the one module, and wherein the different memory enclaves are different logical runtime structures that support the execution of different classes of modules;
calling, by the one module, the other module using the inter-process communication, wherein calling the other module includes the compiler checking a method signature of the other modules in a repository section and comparing the method signature with actual arguments arc return types satisfied to determine whether a compilation error has occurred, wherein the inter-process communication includes one or more communication objects comprising pairs of synchronization objects and corresponding primitives used to synchronize communication between the different memory enclaves, wherein the one or more communication objects are generates by the compiler and used in place of the generated procedure call to communicate between the one module and the other module, and wherein the inter-process communication employs the package generated by the compiler; and
performing, based on calling the other module, one or more operations by the other module.

12. The computer system of claim 11, wherein the method further comprises:

performing one or more operations by the one module, wherein the other module is in a wait state, the one or more operations including the calling the other module by the one module; and
wherein based on the calling the other module, the one module is placed in a wait state.

13. The computer system of claim 12, wherein the one module and the other module behave logically as a single program, in that based on one of the one module or the other module performing work, the other of the one module or the other module is waiting.

14. The computer system of claim 11, wherein the method further comprises sending a reply from the other module to the one module, based on the other module performing at least one operation of the one or more operations.

15. The computer system of claim 11, wherein the one class of module is different from the other class of module based on the one class of module and the other class of module having an attribute selected from a group of attributes consisting of: different addressing modes, different bit-sized modules, different programming languages, different calling conventions, different linkage conventions and different execution properties.

16. A computer-implemented method of facilitating processing within a computing environment, the computer-implemented method comprising:
replacing a generated procedure call between one module and another module with an inter-process communication, absent using user-defined software structures, including:
obtaining a package generated by a compiler of the computing environment to be used in inter-process communication between the one module and the other module, which are running in different memory enclaves in a single address space of the computing environment, wherein the package includes a corresponding inter-process communication call to be used in place of the generated procedure call, wherein the corresponding inter-process communication call is generated by the compiler absent using user-defined software structures, and absent recompiling the one module and the other module, wherein the package includes one or more data conversions of data between the one module and the other module, wherein the one module is one class of module in one memory enclave of the different memory enclaves, wherein the other module is another class of module in another memory enclave of the different memory enclaves, wherein the one class of module is different from the other class of module, wherein the compiler is of a language of the one module, and wherein the different memory enclaves are different logical runtime structures that support the execution of different classes of modules;
calling, by the one module, the other module using the inter-process communication, wherein calling the other module includes the compiler checking a method signature of the other modules in a repository section and comparing the method signature with actual arguments and return types satisfied to determine whether a compilation error has occurred, wherein the inter-process communication includes one or more communication objects comprising pairs of synchronization objects and corresponding primitives used to synchronize communication between the different memory enclaves, wherein the one or more communication objects are generated by the compiler and used in place of the generated procedure call to communicate between the one module and the other module, and wherein the inter-process communication employs the package generated by the compiler; and performing, based on calling the other module, one or more operations by the other module.

17. The computer-implemented method of claim 16, further comprising:

performing one or more operations by the one module, wherein the other module is in a wait state, the one or more operations including the calling the other module by the one module; and wherein based on the calling the other module, the one module is placed in a wait state.

18. The computer-implemented method of claim 17, wherein the one module and the other module behave logically as a single program, in that based on one of the one module or the other module performing work, the other of the one module or the other module is waiting.

19. The computer-implemented method of claim 16, further comprising sending a reply from the other module to the one module, based on the other module performing at least one operation of the one or more operations.

20. The computer-implemented method of claim 16, wherein the one class of module is different from the other class of module based on the one class of module and the other class of module having an attribute selected from a group of attributes consisting of: different addressing modes, different bit-sized modules, different programming languages, different calling conventions, different linkage conventions and different execution properties.

* * * * *